Patented Jan. 27, 1953

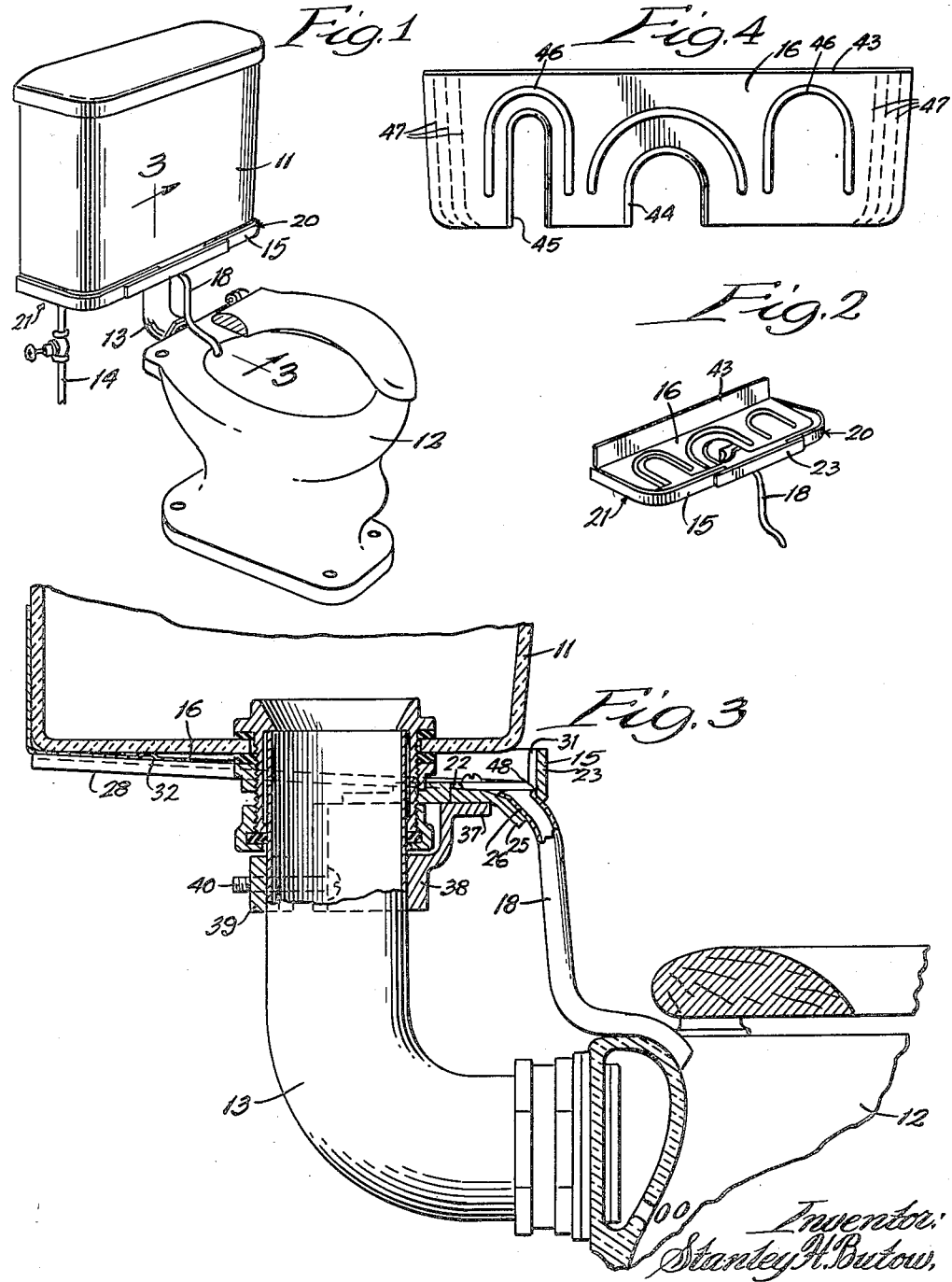

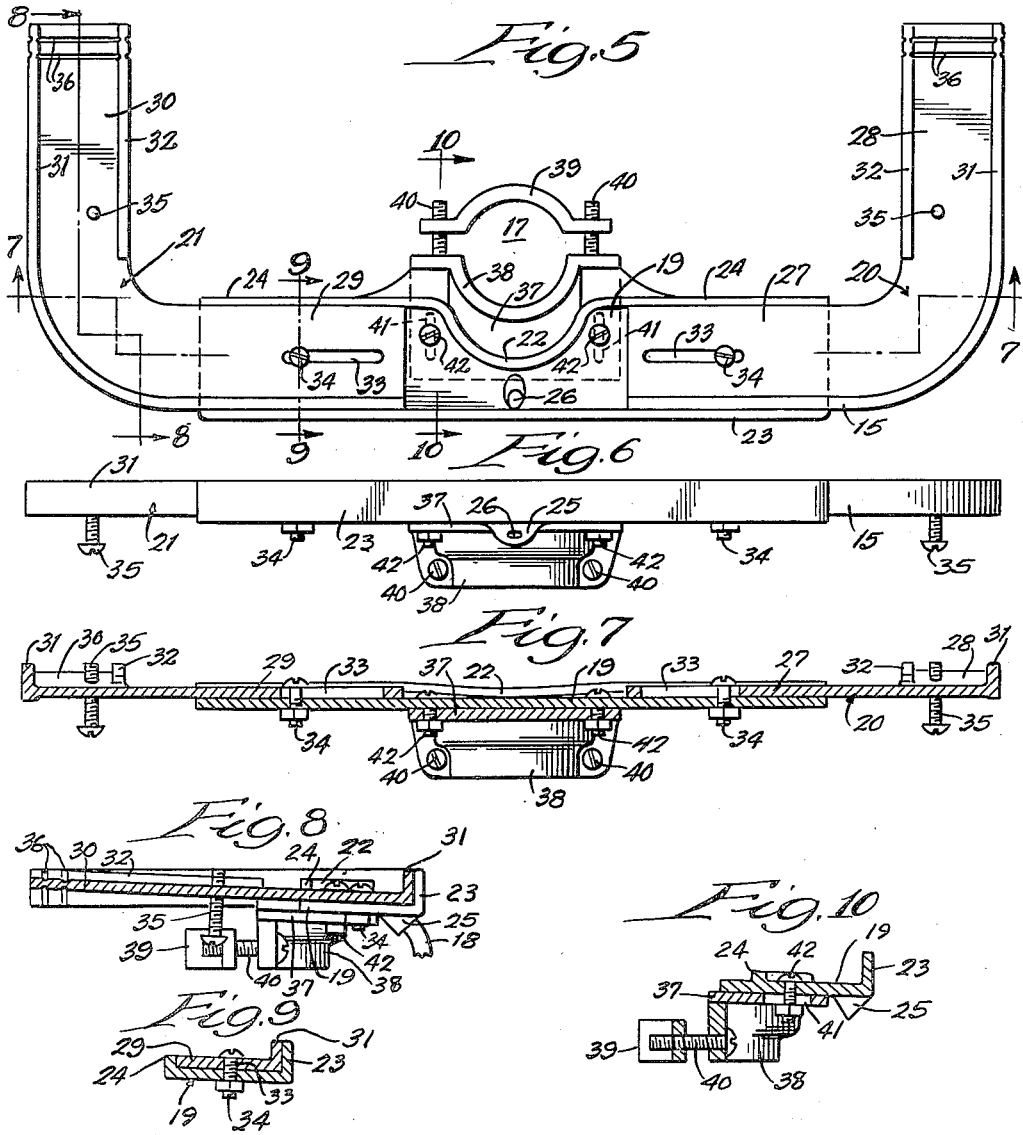

2,626,403

UNITED STATES PATENT OFFICE 2,626,403

MOISTURE COLLECTOR FOR FLUSH TANKS

Stanley H. Butow, Wilmette, Ill.

Application July 28, 1948, Serial No. 41,092

12 Claims. (Cl. 4—252)

One of the annoyances encountered in modern bathrooms and toilets, where the air is warm and fairly humid, is the drip onto the floor of the condensate which collects on the exterior surface of a frequently-flushed toilet tank. In certain areas, during the summer months particularly, this annoyance is very acute. Where such an annoyance occurs frequent mopping up of the moisture is required in order to avoid the risk of deterioration of floors or floor coverings.

The main objects of this invention, therefore, are to provide an improved form of device for collecting and draining off the condensate formed on the exterior wall of a frequently-flushed tank located in a warm, humid room; to provide an improved moisture collector particularly adapted for attachment to the "wall-hung" type of toilet tank; to provide an improved device of this kind formed of a plurality of parts assemblable and relatively positionable so as to approximate the general contour and size of any one of the various makes of wall-hung tanks and constitute an effective but not conspicuous or unattractive accessory to the tank; and to provide a device of this kind which is most economical to manufacture, very easy to assemble and attach, and highly effective in function.

In the drawings,

Fig. 1 is a perspective view of the tank and bowl of a toilet, of the wall-hung type with the tank, whereon is arranged an improved form of moisture collector embodying this invention;

Fig. 2 is a perspective view of such a moisture collector;

Fig. 3 is an enlarged, fragmentary, sectional detail taken on the line 3—3 of Fig. 1;

Fig. 4 is an enlarged plan view of the plate or auxiliary member which is superimposed on the main member to underlie the bottom of the flush tank and ensure that any moisture dripping from any part of the tank will be directed toward the drain from the main member;

Fig. 5 is a plan view of the three-part adjustable U-shaped main member and the clamping element by which the collector is supported on the flush tank below the bottom thereof;

Fig. 6 is a front elevation of the same;

Fig. 7 is a longitudinal, sectional detail taken on the line 7—7 of Fig. 5;

Fig. 8 is a transverse, sectional detail of one of the end parts of the main member, taken on the line 8—8 of Fig. 5;

Fig. 9 is a transverse, sectional detail taken on the line 9—9 of Fig. 5; and

Fig. 10 is a transverse, sectional detail taken on the line 10—10 of Fig. 5.

A toilet tank of the type for which a preferred form of this improved moisture collector is designed for use comprises a tank 11 which is anchored to the wall above a bowl 12 and whereto the tank is connected by a flush pipe 13. Water is supplied to the tank through a pipe 14.

The preferred embodiment of moisture collector herein shown comprises, a main member 15 and a plate or auxiliary member 16 in association with a clamping means 17 whereby these members superimposed are mountable below the bottom of the tank 11 with the perimeters of the members 15 and 16 in approximate vertical alinement with the front, end, and back faces of the tank, so that the moisture dripping from any part of the tank is drained off through a tube 18 into the bowl 12.

The main member 15, as herein shown, is a three-piece assembly comprising a middle part 19 and a pair of right and left end parts 20 and 21. When assembled the three parts simulate the form of a broad, shallow U, as most clearly shown in Fig. 5.

The middle part 19 is of straight rectangular form with the rear intermediate portion offset inwardly, as shown at 22, to permit it to fit around the flush pipe 13. An upstanding flange 23 is formed along the forward perimeter of the middle part 19. As will most clearly appear from Fig. 10, the flange 23 is disposed at an angle slightly less than 90 degrees to the plane of said middle part 19. Thus when the part is clamped to the flush pipe 13 with the flange 23 perpendicular, the part is slightly inclined to the horizontal, thereby ensuring a draining of the collected moisture toward the aperture 26. The flange 23, however, will be disposed vertically. A more shallow flange or rib 24 is formed along the rear perimeter of the part 19 parallel with the flange 23 except where the flange or rib 24 extends around the offset 22. As will appear more clearly hereinafter, these ribs serve as shoulders to secure an effective positioning of the end member parts 20 and 21 on the middle member part 19. Adjacent the flange 23, intermediate the ends thereof, the part 19 is formed with a knob 25 through which extends an aperture 26 to receive the end of the drain pipe 18.

The end member parts 20 and 21 are L-shaped, providing angularly-disposed leg portions 27 and 28 for the part 20 and 29 and 30 for the part 21. A flange 31 is formed around the entire outer perimeter of both leg parts of the end members 20 and 21. The top edges of flanges 31 along the leg portions 27 and 29 are disposed at a slight incline to the plane of the leg portions. Thus when the parts 20 and 21 are assembled on the part 19 and the part 19 is clamped to the flush pipe 13, the top edges of the flanges 31 and 23 of these parts are disposed in a horizontal plane as is clearly apparent from Fig. 8. Because of the angular disposition of the flanges 31 and 23 to their respective parts this disposes the top faces of the parts 19, 20, and 21 forwardly inclined to said horizontal plane, thereby facilitating the drainage of collected moisture toward the forward edge of the middle part 19. This disposition of the flange 31 results in the flange along the outer perimeter of the leg portions 28 and 30 increasingly protruding below said leg portions toward the rear ends of said leg portions 28 and 30 as will most clearly appear from Fig. 8.

The flange 31 is of a height so that when the end member parts 20 and 21 are assembled on the middle member the upper edge of the flange 31 along the leg portions 27 and 29 is substantially flush with the upper edge of the flange 23 of the middle part 19. A more shallow flange or rib 32 is formed along the inner perimeters of the leg parts 28 and 30 of the respective member parts 20 and 21. This is to ensure drainage of moisture, collecting on these leg portions, toward the forward edge of the middle part 19.

The width of the leg portions 27 and 29, of the parts 20 and 21, from the outer face of the flange 31 to the rear edge of said leg part is substantially equal to the distance between the inner face of the flange 23 and that of the parallel portions of the flange or rib 24. Thus the two end parts 20 and 21 may be assembled on the middle member 19 so as to fit in between the flanges 23 and 24, and by them be held in firm but shiftable alinement with the part 19. This permits the end members 20 and 21 to be so positioned on the middle part 19 that the flanges 31 along the outer perimeters of the legs 28 and 30 can be alined with the vertical end walls of the tank 11. This makes it possible to appropriately accommodate the contour of the flanges 23 and 31 of the main member 15 to tanks of varying dimensions.

The leg portions 27 and 29 of the end parts 20 and 21 are each provided with elongated recesses 33 through which extend bolts or set screws 34 for clamping said overlapping leg portions to the middle part 19.

Set screws 35 are threaded into the leg portions 28 and 30 of the parts 20 and 21 perpendicular to the plane of the leg portions 28 and 30. These screws are adapted to abut the bottom of the tank 11 so as to adjust the pitch of the main member 15 so as to ensure the draining of moisture collecting thereon toward the aperture 26.

The rear ends of the leg portions 28 and 30 are grooved, as shown at 36 in Figs. 5 and 8, to facilitate the severing of short sections of the ends of said leg portions. On occasions this may need to be done so as to accommodate the leg portions 28 and 30 to the front-to-back distance between the front face of the tank 11 and the wall whereon the tank is hung, in order that the flanges 23 and 31 of the main member 15 may be properly alined with the front face of the tank 11 through the adjustment of the clamping means 17.

The clamping means 17 comprises a plate 37 with an arcuate-shaped hub 38 and an arcuate-shaped strap 39, adjustably secured to the hub part 38. Screws 40 support the plate and strap in opposed relation and permit them to embrace and be firmly clamped to the supply pipe 13 for the purpose of mounting the member 15 in proper position under the tank 11. As will be clearly observed from Fig. 10, the plate is slightly inclined to the axis of the hub 38 and strap 39 and the coincidental axis of the flush pipe 13. This ensures proper positioning of the members 15 and 16 to secure the required drainage of collected moisture to the forward edge of the member 15. The plate 37 is provided with elongated recesses 41 through which bolts 42 extend to permit the member 15 to be adjustably fixed on the clamping means 17 and ensure the approximate vertical alinement of the flanges 23 and 31 with the front vertical face of the tank 11.

The auxiliary member or plate 16, as herein shown, is a sheet metal stamping of a nearly rectangular form approximating the contour of the member 15 within the flanges 31. The rear edge is turned up to provide a flange 43 which is adapted to be inserted between the tank 11 and the wall whereon it is hung (see Fig. 3). Inwardly extending recesses 44 and 45 are formed to receive the flush pipe 13 and the water supply pipe 14, thus permitting the member 16 to be superimposed upon the main member 15 after it has been clamped in position on the flush pipe 13 and adjusted to the contour of the tank 11. The perimeters of the recesses 44 and 45 are embossed so as to deflect any moisture collecting on the member 16 adjacent these recesses. Other embossments 46 are formed around and a bit remote from the recesses 44 and 45 to further facilitate the drainage of moisture collecting on the member 16 toward the forward edge of the main member 15.

At its ends the member 16 is provided with a number of scores or depressions 47 which indicate points at which sections of the ends may be sheared off so that the length of the member 16 may be accommodated to the adjusted distance between the flanges 31 on the leg portions 28 and 30 of the end member parts 20 and 21.

The drain pipe 18 may be of any suitable material having its upper end anchored at 48 in the aperture 26 and having its lower end extending into the bowl 12 below the toilet seat.

Variations and modifications in the details of structure and arrangement of the parts may be resorted to within the spirit and coverage of the appended claims.

I claim:

1. In a moisture collector for flush tanks the combination of a U-shaped member having upstanding flanges around the outer perimeter of the base and the two legs thereof, a clamp mounted adjacent the inner perimeter of said base part of said member adapted to secure said member to the tank outlet under and contiguous to the bottom of said tank, and a plate provided with recesses extending rearwardly from the front edge to receive the water-supply and -outlet pipes for said tank respectively and permit said plate to be superimposed on said member inwardly of said flanges when said member is attached to said tank outlet.

2. In a moisture collector for flush tanks the combination of a U-shaped member having upstanding flanges around the outer perimeter of the base and the two legs thereof, a clamp mounted adjacent the inner perimeter of said base part of said member adapted to secure said member to the tank outlet under and contiguous to the bottom of said tank, a plate provided with recesses extending rearwardly from the front edge to receive the water-supply and -outlet pipes for said tank respectively and permit said plate to be superimposed on said member inwardly of said flanges when said member is attached to said tank outlet, and adjusting screws on the legs of said U-shaped member adapted for contact against the bottom of said tank whereby to determine the forward pitch of said member to cause the flow of collected moisture forwardly thereon.

3. In a moisture collector for flush-tanks the combination of a U-shaped member having upstanding flanges around the outer perimeter of the base and the two legs thereof with the portion of said base rearwardly of the front perimetrical flange being disposed at an angle slightly less than 90 degrees, a clamp mounted adjacent the inner perimeter of said base part of said member adapted to secure said member to the tank outlet under and contiguous to the bottom of said tank, and a plate provided with recesses extending rearwardly from the front edge to receive the water-supply and -outlet pipes for said tank respectively and permit said plate to be superimposed on said member inwardly of said flanges when said member is attached to said tank outlet.

4. In a moisture collector for flush tanks the combination of a U-shaped member having upstanding flanges around the outer perimeter of the base and the two legs thereof, a clamp mounted adjacent the inner perimeter of said base part of said member adapted to secure said member to the tank outlet under and contiguous to the bottom of said tank, and a plate provided with recesses extending rearwardly from the front edge to receive the water-supply and -outlet pipes for said tank respectively and permit said plate to be superimposed on said member inwardly of said flanges when said member is attached to said tank outlet, the inner ends of the legs of said U-shaped member having one or more transverse grooves formed therein to facilitate the severing of end sections of said legs so as to shorten the same whereby said member may be positioned on said tank outlet with said front flange approximating vertical alinement with the front vertical face of said tank.

5. In an adjustable moisture collector for flush tanks the combination of a member comprising a separately-formed middle straight part and two L-shaped end parts each having a vertical flange formed along the outer edges thereof, means for adjustably clamping the three parts of said member in assembled relation in the shape of a U with said flanges positioned to approximate the contour of the front and ends of any one of several tanks of varying dimensions, and other means for adjustably clamping said member to the outlet of said tank so that said flanges approximate vertical alinement with the front and end faces of the selected tank.

6. In a moisture collector for flush tanks the combination of a member comprising a separately-formed middle straight part and two L-shaped end parts each having a vertical flange formed along the outer edges thereof, means for adjustably clamping the three parts of said member in assembled relation in the shape of a U with said flanges approximating the contour of the front and ends of said tank, other means for clamping said member to the outlet of said tank so that said flanges approximate vertical alinement with the front and end faces of said tank, and an adjusting screw on each of the rearwardly-extending legs of said L-shaped parts adapted for contact against the bottom of said flush tank whereby to determine the forward pitch of said member to cause the flow of collected moisture forwardly thereon.

7. In a moisture collector for flush tanks the combination of a member comprising a separately-formed middle straight part and two L-shaped end parts each having a vertical flange formed along the outer edges thereof, means for adjustably clamping the three parts of said member in assembled relation in the shape of a U with said flanges approximating the contour of the front and ends of said tank, other means for clamping said member to the outlet of said tank so that said flanges approximate vertical alinement with the front and end faces of said tank, and a plate provided with recesses extending rearwardly from the front edge to receive the water-supply and -outlet pipes for said tank respectively and permit said plate to be superimposed on said member inwardly of said flanges when said member is attached to said tank outlet.

8. In an adjustable moisture collector for flush tanks the combination of a member comprising a separately-formed middle straight part and two L-shaped end parts each having a vertical flange formed along the outer edges thereof, the flange of the middle part being disposed at an angle slightly less than 90 degrees to the plane of the part means for adjustably clamping the three parts of said member in assembled relation in the shape of a U with said flanges positioned to approximate the contour of the front and ends of any one of several tanks of varying dimensions and with the bottoms of the members inclined slightly downward from the horizontal, and other means mounted on said middle part for adjustably clamping said member to the outlet of said tank and permitting shifting of said member horizontally so that said flanges approximate vertical alinement with the front and end faces of the selected tank.

9. In a moisture collector for flush tanks the combination of a member comprising three separately-formed parts assembled to form a U with the exterior edges of the base and legs of said U approximating the contour of the front and ends of a tank, the middle part having an upstanding flange formed along the front edge thereof, a clamp secured to the rear perimeter of said middle part whereby the three assembled parts may be clamped to the tank outlet below said tank, the other two member parts being oppositely L-shaped and each having an upstanding flange formed around the outer perimeters thereof, said L-shaped parts being adapted to fit in opposed relationship on opposite ends of said middle member with the flanges along the front edges of said L-shaped parts abuttingly overlapping the flange on said middle part, means for clamping said three parts in said assembled relation, and a plate provided with recesses extending rearwardly from the front edge to receive the water-supply and -outlet pipes for said tank respectively and permit said plate to be superimposed on said member inwardly of said flanges when said member is attached to said tank outlet.

10. In a moisture collector for flush tanks the combination of a member comprising a separately-formed middle straight part and two L-shaped end parts each having a transverse flange formed along the outer edges thereof, means for adjustably clamping the three parts of said member in assembled relation in the shape of a U with said flanges approximating the contour of the front and ends of said tank, other means for clamping said member to the outlet of said tank so that said flanges approximate vertical alinement with the front and end faces of said tank, and a plate provided with recesses extending rearwardly from the front edge to receive the water-supply and -outlet pipes for said tank respectively and permit said plate to be superimposed on said member inwardly of said flanges when said member is attached to said tank outlet, the ends of the rearwardly-extending legs of said L-shaped parts having one or more grooves formed therein to facilitate the severing of the ends from said legs so as to shorten the same whereby said member may be positioned on said tank outlet with said flanges approximately in vertical alinement with the front vertical face of said tank, said plate being scored along the opposite ends to indicate where the ends of said plate may be severed to permit said plate to fit within the end flanges on said L-shaped members.

11. In combination, a wall-hung toilet flush tank, a U-shaped member the outer perimeter of which approximates the contour of the front and ends of said tank and having an upstanding flange formed along said tank-conforming perimeter, clamping means for mounting said member to the outlet for said tank with said flanges in approximate vertical alinement with the front and end faces of said tank, and a plate provided with recesses extending inwardly from the front edge thereof to receive the water-supply and -outlet pipes for said tank respectively and permit said plate to be superimposed on said member inwardly of said perimetrical flange when said member is attached to said tank outlet.

12. In combination, a wall-hung flush tank, a U-shaped member comprising a separately-formed middle straight part and two L-shaped end parts each having transverse flanges formed along the outer perimeters thereof, means adjustably clamping said three parts in assembled relationship whereby said flanges approximate the contour of the front and ends of said tank, and other means for clamping said assembled parts to the outlet of the said tank with said flanges approximating vertical alinement with the front and end faces of said tank, and a plate provided with recesses extending inwardly from the front edge thereof to receive the water-supply and -outlet pipes for said tank respectively and permit said plate to be superimposed on said member inwardly of said perimetrical flange when said member is attached to said tank outlet.

STANLEY H. BUTOW.

REFERENCES CITED

The following references are of record in the file of this patent:

UNITED STATES PATENTS

| Number | Name | Date |
| --- | --- | --- |
| 905,737 | McCombe | Dec. 1, 1908 |
| 986,905 | Carlson | Mar. 14, 1911 |
| 1,230,992 | Brigham | June 26, 1917 |
| 1,785,877 | Rubner | Dec. 23, 1930 |
| 1,788,893 | Schetzer | Jan. 13, 1931 |
| 1,809,216 | Quandt | June 9, 1931 |
| 2,156,174 | Braatz | Apr. 25, 1939 |
| 2,374,756 | Kisch et al. | May 1, 1945 |